United States Patent [19]

Nielsen

[11] Patent Number: 5,315,607
[45] Date of Patent: May 24, 1994

[54] DUAL USE POWER SUPPLY CONFIGURATION FOR THE DOUBLE PULSED FLASHLAMP PUMPED DYE LASER

[75] Inventor: Keith E. Nielsen, Redondo Beach, Calif.

[73] Assignee: Hughes Aircraft Company, Los Angeles, Calif.

[21] Appl. No.: 28,496

[22] Filed: Mar. 9, 1993

[51] Int. Cl.$^5$ ............................................... H01S 3/00
[52] U.S. Cl. ........................................ 372/38; 372/25
[58] Field of Search ....................... 372/25, 38, 70, 86

[56] References Cited

U.S. PATENT DOCUMENTS

| | | | |
|---|---|---|---|
| 4,276,518 | 6/1981 | Ferguson | 372/26 |
| 5,204,867 | 4/1993 | Koschmann | 372/25 |

Primary Examiner—Rodney B. Bovernick
Assistant Examiner—Robert E. Wise
Attorney, Agent, or Firm—Hugh P. Gortler; Michael W. Sales; W. K. Denson-Low

[57] ABSTRACT

A dual pulse flashlamp-pumped laser system (50) having a power supply circuit (62) which not only charges two capacitors (C1, C2) which are successively discharged to produce two laser pulses, but also supplies a simmer current through the flashlamp (58) between the pulses. The first laser pulse follows a trigger pulse on a flashlamp trigger wire (60) which ionizes the flashlamp gas, permitting a first capacitor (C1) to discharge through the flashlamp (58). The simmer current maintains the flashlamp gas in an ionized state, so that a second trigger pulse is not needed. The second laser pulse follows an SCR-controlled discharge of the second capacitor (C2) through the flashlamp (58).

12 Claims, 3 Drawing Sheets

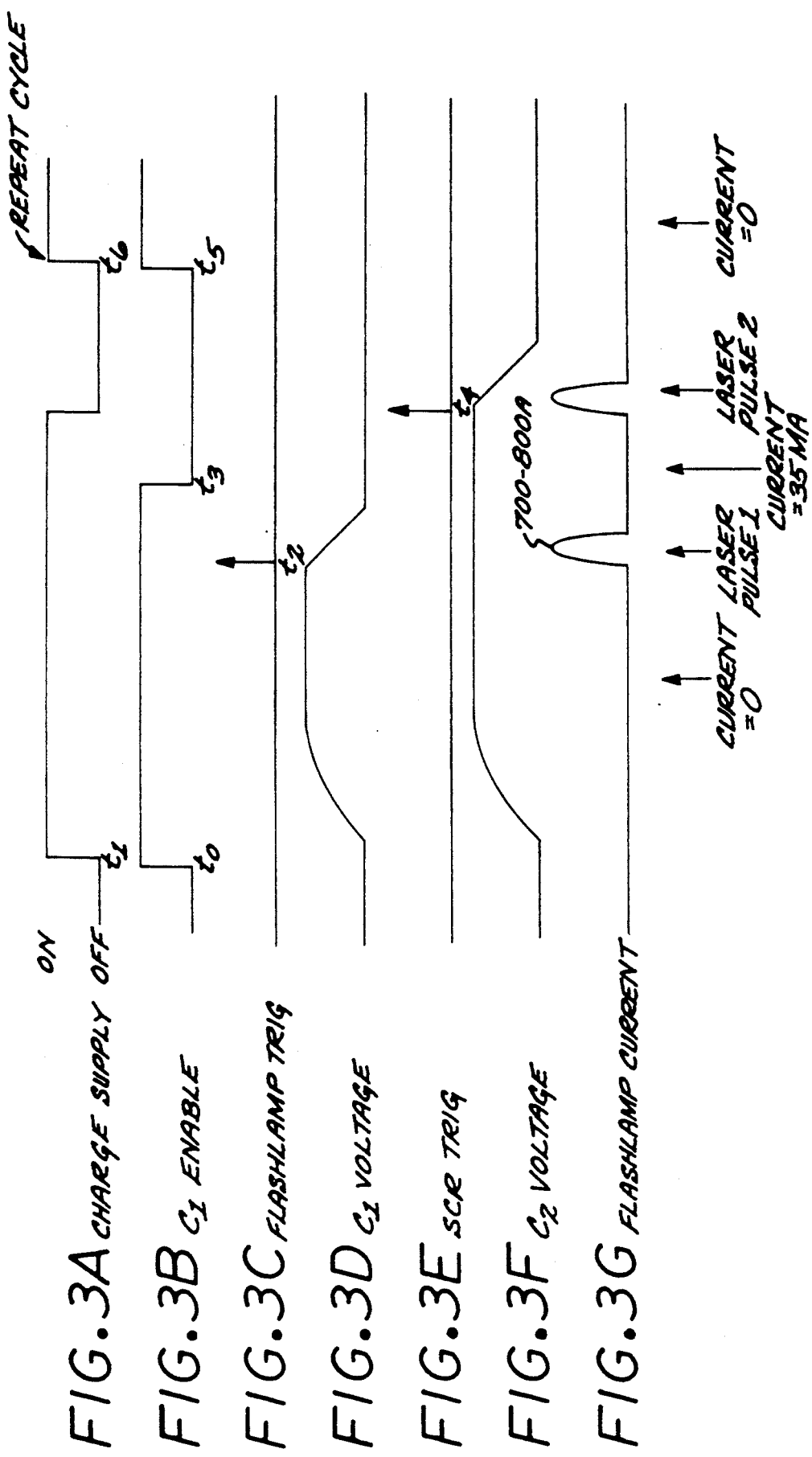

DUAL USE POWER SUPPLY CONFIGURATION FOR THE DOUBLE PULSED FLASHLAMP PUMPED DYE LASER

BACKGROUND OF THE INVENTION

The invention relates to flashlamp pumped dye lasers, and more particularly to a power supply configuration for achieving double pulsed operation.

Flashlamp pumped dye lasers are a well known class of lasers. The flashlamp pumped dye laser includes a charge power supply to charge a capacitor which is discharged in order to create the pulse needed to provide pulsed laser operation. The power supply conventionally provides a single pulse, there being a relatively long time interval required in order to provide another pulse.

There are, however, some application that require a pair of closely occurring laser pulses. One such application is that of Laser Identification of Friend or Foe (IFF). This application requires two laser pulses spaced apart by a minimum of 50 milliseconds to a maximum of 125 milliseconds. Simple modification of the conventional charge power supply, e.g., charging two capacitors and then discharging the capacitors with a time interval between them to provide two pulses, does not solve the problem. For example, the capacitors would be charged with the power supply, and the laser would be fired by discharging the first capacitor with the usual high voltage trigger pulse on the flashlamp. After delaying to separate the pulses, the laser could be fired again by somehow discharging the second capacitor through some combination of SCR and the high voltage trigger pulse on the flashlamp. The problem with triggering the second pulse is that if the power supply is used only in the conventional manner to charge the capacitors, the SCR would have to be triggered at exactly the same time as when the high voltage trigger pulse ionizes the gas in the flashlamp. This would create a very difficult timing problem between triggering the SCR and the high voltage trigger pulse ionizing the gas in the flashlamp. A further disadvantage is that a flashlamp trigger pulse is required to produce each laser pulse, since the flashlamp life is very dependent on the number of high voltage trigger pulses which have been applied.

It is therefore an object of this invention to provide a double pulsed flashlamp pumped dye laser.

A further object is to provide a double pulsed flashlamp pumped laser which requires only a single flashlamp trigger in order to obtain the two closely spaced pulses.

SUMMARY OF THE INVENTION

A dual pulse flashlamp-pumped laser system includes laser cavity-defining means with laser material disposed therein, and a flashlamp for providing pump light to excite laser material. The flashlamp includes a gas-filled lamp chamber. Means are provided for ionizing the gas in the flashlamp, typically a high voltage trigger pulse.

The laser system further includes means for discharging a first current pulse through the flashlamp to cause a first high intensity light flash and thereby pumping the laser material to emit a first laser pulse.

The laser system further includes means for maintaining the gas in the ionized state for a predetermined time interval after the first current pulse and until a second current pulse is discharged through the flashlamp.

Means are further provided for discharging a second current pulse through the flashlamp a delay time interval after the first current pulse, thereby pumping the laser material to emit a second laser pulse. The flashlamp therefore does not require a second high voltage trigger pulse to ionize the gas prior to flashing the lamp a second time.

In a preferred embodiment, the means for discharging a first current pulse comprises a first charged capacitor, the capacitor being discharged into the flashlamp as a result of the ionization of the gas in the flashlamp. The means for discharging a second current pulse preferably comprises a second charged capacitor and means for discharging the second capacitor with a delay time interval after the first current pulse from the first capacitor being discharged.

A further aspect of the invention is that the means for maintaining the gas in the ionized state comprises means for passing a simmer current through the flashlamp, and is preferably a power supply also used to charge the two capacitors.

BRIEF DESCRIPTION OF THE DRAWING

These and other features and advantages of the present invention will become more apparent from the following detailed description of an exemplary embodiment thereof, as illustrated in the accompanying drawings, in which:

FIGS. 3A–3G are timing diagrams illustrative of the dual pulse operation of the system of FIG. 1.

DETAILED DESCRIPTION OF THE PREFERRED EMBODIMENT

Figure 1:
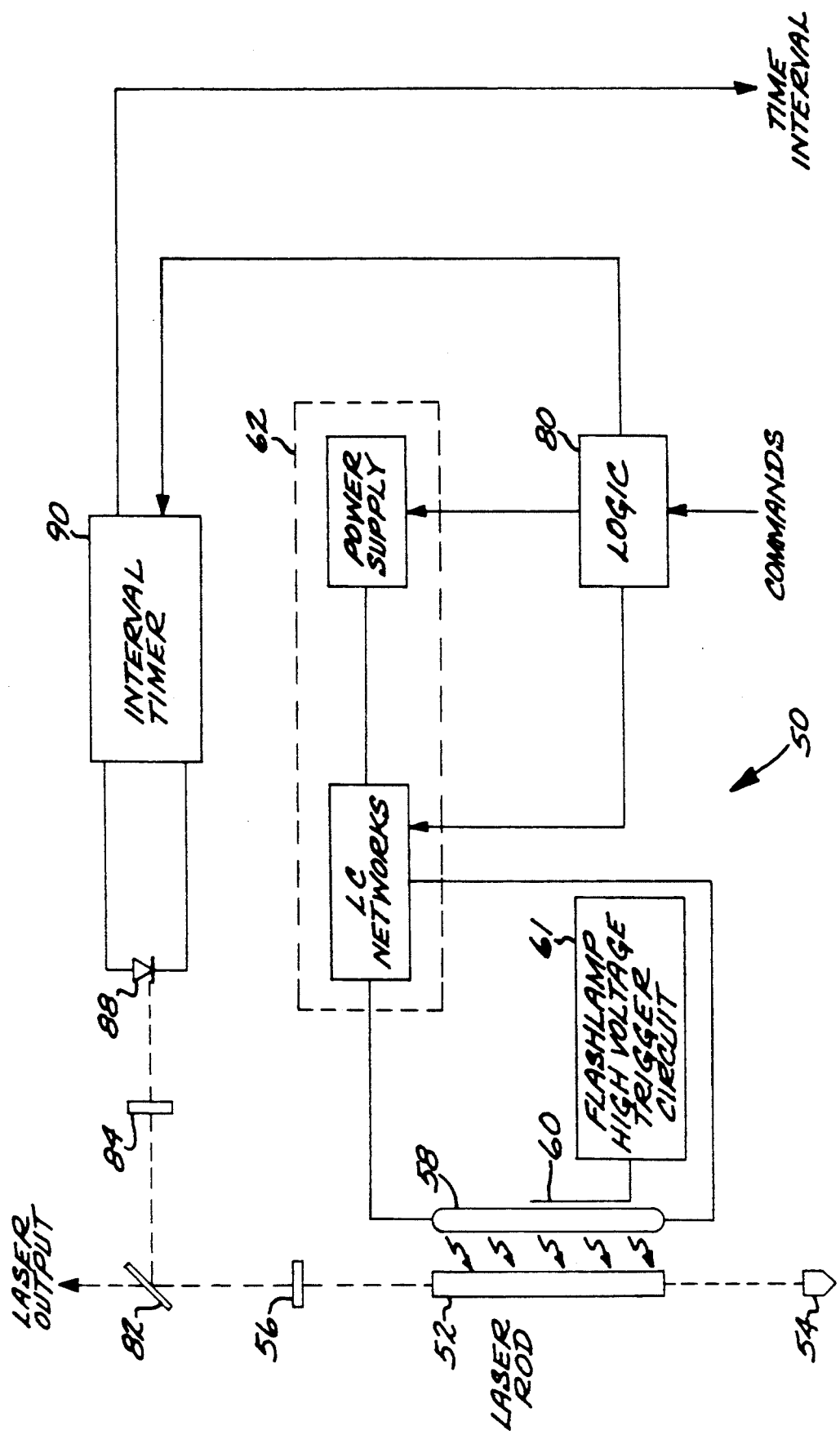
FIG. 1 is a simplified block diagram of a flashlamp pumped laser system in accordance with this invention.

FIG. 1 illustrates in simplified schematic form a flashlamp pumped dye laser system 50 embodying the invention. As is well known, the laser system 50 includes means for defining a laser cavity, and laser material such as a laser rod 52 mounted in the cavity between a 100% reflector 54 and an output coupler 56, a dye cell. The coupler 56 reflects laser light of an intensity below some threshold, and partially reflects and partially transmits the laser light when the intensity exceeds the threshold. The rod 52 is excited by a flashlamp 58, which is triggered by a high voltage pulse on trigger wire 60 from high voltage trigger circuit 61. Voltage is supplied to the flashlamp 58 by a power supply circuit 62. A logic circuit 80 controls the high voltage trigger circuit 61 and the power supply circuit 62.

The light transmitted through the output coupler 56 is incident on a beam splitter 82, which splits a small portion of the output light off through an energy diffuser/attenuator 84 to a photodetector 88. An interval timer 90 responds to the photodetector output to time the interval between output pulses and provide an output indicative of the measured time interval. This output is useful for the IFF application.

Figure 2:
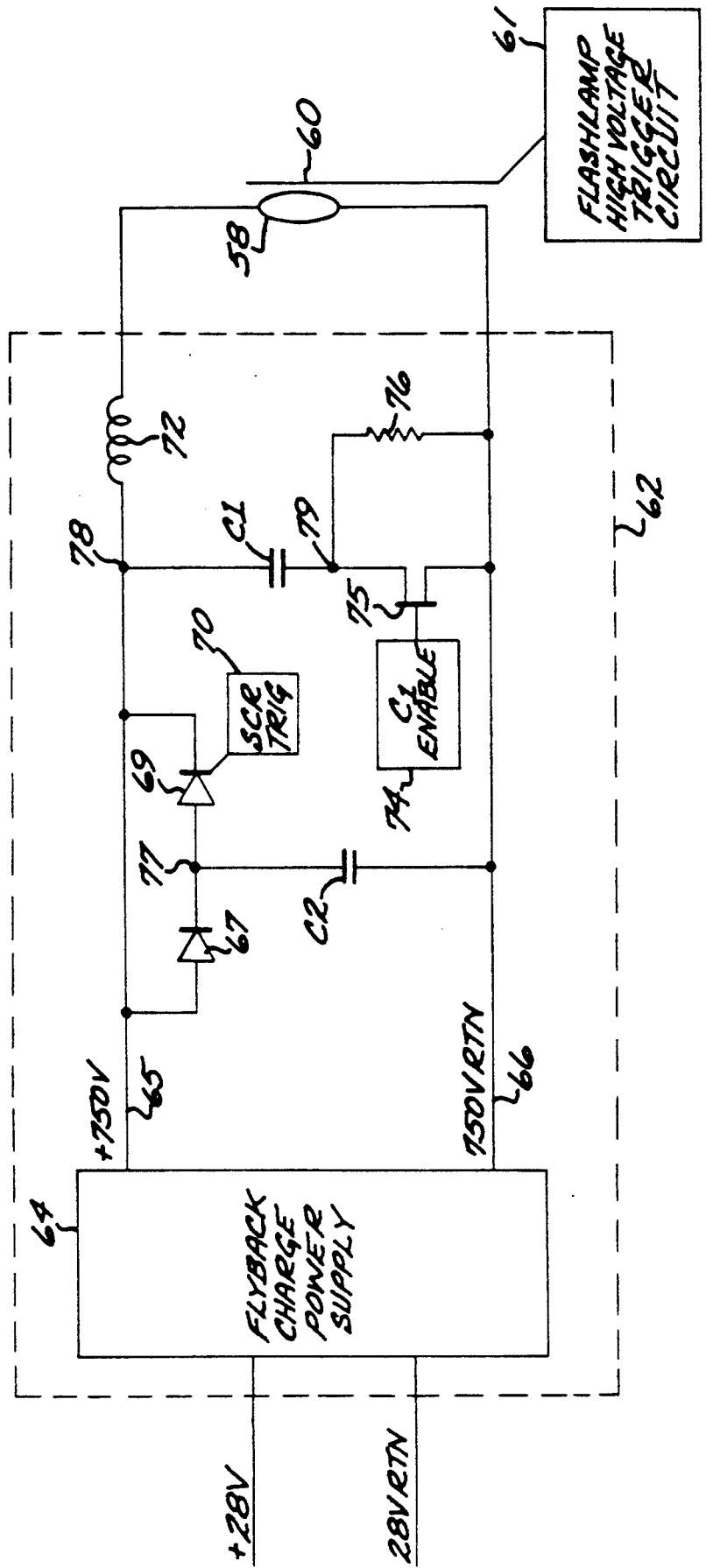
FIG. 2 is a schematic diagram of the power supply circuit employed in the laser system of FIG. 1.

FIG. 2 illustrates the circuit 62 in further detail. The circuit includes a conventional flyback charge power supply 64, which is connected to a source of dc power, the +28 V and 28 V return. The supply circuit 64 develops a high voltage, e.g., +750 V, across its output terminals, to which are connected lines 65 and 66. Capacitor C2 is connected between node 77 and line 66. A diode 67 connects node 77 to line 65. An SCR 69, triggered by an SCR trigger circuit 70 controlled by the logic circuit 80, also connects the node 77 to line 65. Another capacitor C1 is connected between node 78 and node 79. An FET switch 75 is connected between node 79 and return line 66; a C1 enable 74 is connected to the gate of the switch 75. A one Megohm resistor 76 is connected in parallel with the FET switch. Inductor 72 is connected between node 78 and one terminal of the flashlamp 52. The other terminal of the flashlamp 52 is connected to the return line 66.

The trigger circuit 61 includes a transformer to step the voltage up to the high voltage needed for the trigger pulse, e.g., 15 KV to 20 KV. The SCR trigger circuit 70 also includes a transformer to provide isolation against the voltage (750 V) provided by the power supply 64.

The power supply circuit 62 further includes an inductor 72, in order to limit the peak current level discharged through the flashlamp so that the peak current rating of the flashlamp is not exceeded. The circuit 62 is also typically required to provide a desired current pulse width. Typically the flashlamp manufacturer specifies the peak current rating, and a desired current pulse width is specified based upon the laser rod material. From these parameters, the values for both the capacitors C1 and C2 and the inductors 72 may be calculated, typically in a manner specified by the flashlamp manufacturer. The capacitors C1 and C2 will have the same capacitance for pulses with the same peak current and pulse width.

In accordance with the invention, the power supply 64 is used not only to charge the capacitors C1 and C2, but to keep current flowing in the flashlamp 58. With the flashlamp maintained in a "simmer" status after the first pulse, there is no need for a second high voltage trigger pulse to be applied to the flashlamp 58 in order to trigger the second pulse. The power supply 64 provides a current of about 35 mA at about 200 V, which is sufficient to simmer the flashlamp.

The laser system 50 operates in the following manner, as illustrated by the timing diagrams of FIGS. 3A-3G. At time t0, the C1 enable signal is brought to the active high state, turning on the FET 75, bypassing the resistor 76 and permitting capacitor C1 to be charged. At time t1, the power supply 64 is turned on, and commences charging both capacitors C1 and C2, as shown in FIGS. 3D and 3F.

At time t2, after the capacitors have been charged, the laser is fired by discharging capacitor C1 with the usual high voltage trigger pulse on the flashlamp supplied by the circuit 61. The trigger pulse ionizes the gas in the flashlamp, changing the lamp impedance from a high value to a low value and thereby permitting a large current pulse to flow through the flashlamp supplied by the capacitor C1 discharge, as shown in FIG. 3G. The current pulse is typically on the order of 700 A. The power supply 64 is not shut off during or after the triggering of the flashlamp 58 for this first laser pulse. Current flows through the flashlamp at a low level, e.g., 35 mA, after the first laser pulse, at a level sufficient to simmer the flashlamp, i.e., to maintain the gas in the flashlamp in an ionized state.

At time t3, the C1 enable signal is disabled, so that the FET 75 is non-conductive, taking capacitor C1 effectively out of the circuit. This is done so that capacitor C1 does not become an additional load when capacitor C2 is discharged, allowing the full energy stored in capacitor C2 to be applied to the flashlamp. A timed delay occurs, of a length required by the IFF coding for example. During this time delay, the power supply is kept on, and the low level simmer current continues to flow through the flashlamp.

At time t4, the SCR trigger signal causes the SCR 69 to become conductive, discharging capacitor C2 through the SCR into the flashlamp 58. This is all that is needed to fire the laser again, since the gas in the flashlamp 58 is still in the ionized state due to the low level current from the power supply 64. The power supply 64 is then shut off for a short time, extinguishing the flashlamp 58. The capacitor C1 is then reconnected at time t5 for recharging, and the power supply 64 is again enabled at time t6, permitting the dual pulse cycle to repeat.

More than one FET can be used as switch 75, to allow using FETs with lower voltage ratings. While there is a conduction loss in the FET during the high current operation, the circuit 61 only switches at close to zero current and zero voltage, minimizing the switching loss.

In addition to providing dual pulse capability, advantages of the invention include extending the life of the flashlamp and elimination of the timing problem between triggering the SCR and the high voltage trigger pulse ionizing the gas in the flashlamp. Moreover, conventional single pulse flashlamp pumped dye lasers can be readily converted to dual pulse operation by changing the power supply circuit to that shown in FIG. 2.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A dual pulse flashlamp-pumped laser system, comprising:
    laser cavity-defining means with laser material disposed therein;
    a flashlamp means for providing pump light to excite said laser material, said flashlamp means comprising a gas-filled lamp chamber;
    means for ionizing said gas in said flashlamp;
    means for discharging a first current pulse through said flashlamp to cause a first high intensity light flash and thereby pumping said laser material to emit a first laser pulse;
    means for maintaining said gas in said ionized state for a predetermined time interval after said first current pulse until a second current pulse is discharged through said flashlamp; and
    means for discharging a second current pulse through said flashlamp a delay time interval after said first current pulse, thereby pumping said laser material to emit a second laser pulse.

2. The laser system of claim 1, wherein said maintaining means is disabled after said second current pulse is discharged, permitting said flashlamp to become extinguished.

3. The laser system of claim 1 wherein said means for ionizing said gas comprises a trigger wire and means for applying a high voltage pulse on said trigger wire.

4. The laser system of claim 1 wherein said means for discharging a first current pulse comprises a first charged capacitor, said capacitor being discharged into said flashlamp as a result of said ionization of said gas in said flashlamp.

5. The laser system of claim 4 wherein said means for discharging a second current pulse comprises a second charged capacitor and means for discharging said capacitor said delay time interval after said first current pulse has been discharged.

6. The laser system of claim 5 further comprising power supply means for charging said first and second capacitors to a high voltage, and wherein said power supply means further supplies a simmer current to be passed through said flashlamp in the time interval between said first and second current pulses, wherein said means for maintaining said gas in said ionized state comprises said power supply.

7. The laser system of claim 1 wherein said means for maintaining said gas in said ionized state comprises means for passing a simmer current through said flashlamp of a sufficient magnitude to maintain said gas in said ionized state.

8. The laser system of claim 1 wherein said laser-defining means comprises an output optical coupler, said coupler comprising a dye cell.

9. A dual pulse flashlamp-pumped dye laser system comprising:
    laser-cavity defining means having a laser rod disposed therein between a reflector and an output coupler;
    a flashlamp arranged to excite said rod by intense light flashes, said flashlamp comprising a gas-filled lamp chamber;
    a flashlamp trigger wire and means for applying a high voltage trigger pulse to said wire to ionize said gas within said chamber; and
    a power supply circuit connected to said flashlamp, said circuit comprising:
    first and second capacitor circuits disposed in a parallel relationship with said flashlamp, said first circuit comprising a first capacitor, said second circuit comprising a second capacitor and means for selectively connecting and disconnecting said second capacitor across said flashlamp in response to a control signal a delay time interval after said trigger pulse;
    a power supply for providing a high supply voltage output between first and second output nodes, said first and second capacitor circuits disposed in a parallel arrangement across said output nodes so as to charge said first and second capacitors and to provide a simmer current through said flashlamp when said gas is ionized;
    wherein said first capacitor discharges when said trigger pulse is applied to ionize said gas, thereby providing a first current pulse through said flashlamp to pump said laser rod and produce a first laser pulse, and said second capacitor discharges in response to said control signal a delay time interval after said trigger pulse, thereby providing a second current pulse through said flashlamp to said laser rod and produce a second laser pulse.

10. The laser system of claim 9 wherein said first capacitor circuit further comprises means for disconnecting said first capacitor from said power supply in response to a disable signal after said first capacitor has been discharged, wherein said first capacitor does not become a load on said second capacitor when said second capacitor is discharged.

11. The laser system of claim 10 wherein means for disconnecting said first capacitor from said power supply comprises a field effect transistor switch disposed in series with said capacitor.

12. The laser system of claim 9 wherein said means for selectively connecting and disconnecting said second capacitor comprises a diode circuit connected in series between said capacitor and said flashlamp, said diode circuit comprising a parallel connection of a first diode connected to said first power supply node and a silicon controlled rectifier switch connected between capacitor and said flashlamp.

* * * * *